INVENTOR.
FRANK MASSA JR.

BY Louis Bernat
ATTY.

Aug. 18, 1970  F. MASSA, JR  3,525,071
ELECTROACOUSTIC TRANSDUCER
Filed April 10, 1968   2 Sheets-Sheet 2
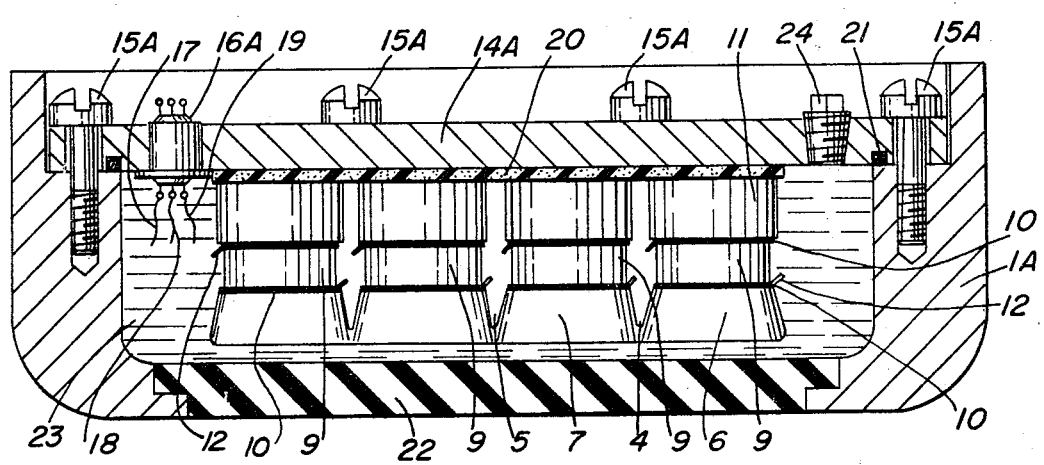
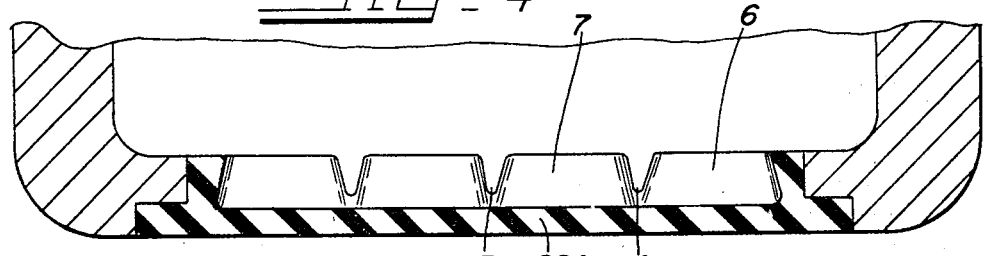
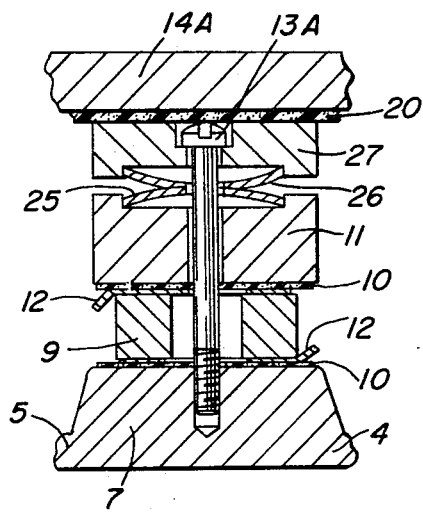
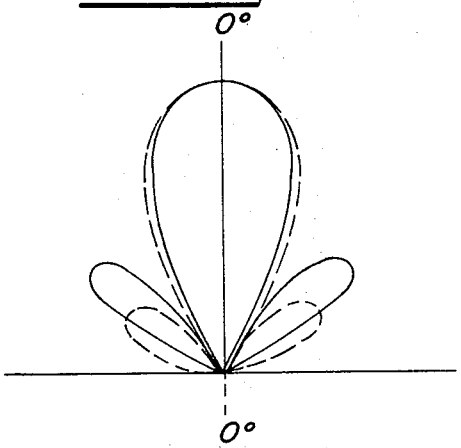
INVENTOR.
FRANK MASSA JR.
BY Louis Bernat United States Patent Office 3,525,071
Patented Aug. 18, 1970

1

3,525,071
ELECTROACOUSTIC TRANSDUCER
Frank Massa, Jr., Cohasset, Mass., assignor to Dynamics Corporation of America, Hingham, Mass.
Filed Apr. 10, 1968, Ser. No. 720,147
Int. Cl. H04r 17/00, 7/06
U.S. Cl. 340—9                                    13 Claims

ABSTRACT OF THE DISCLOSURE

An underwater transducer uses a vibratile plate piston type sonic radiator, wherein the diameter of the plate is greater than the wavelength of the radiated sound. The plate is undercut with grooves which form a number of piston islands interconnected by a thin web. A separate transducer drives each piston island. Phase comparisons from quadrants or halves of the sonic radiator may be used for steering information. Shading may be provided by four symmetrical quadrants having novel series connections.

---

A co-pending application Ser. No. 737,198, filed June 14, 1968, entitled "Electroacoustic Transducer," contains subject matter similar to the subject matter disclosed herein. Both of these inventions are by the same inventor and are assigned to the same assignee.

This invention relates generally to transducers and more particularly to transducers for operation under water. The invention is more particularly concerned with an improved method for constructing a transducer when a transducer is required to display a directional beam pattern during its operation and further when it may be desirable that the secondary lobes be reduced in magnitude from that of a simple unshaded piston radiating surface. My invention is particularly useful for transducers in which the linear dimensions of the radiating surface are generally larger than the wavelength of sound in the medium at its frequency of operation. Another particularly useful application for my invention is in a transducer required to have multiple beam characteristics in order that acoustic signals received by the transducer may be used for steering purposes such as, for example, in connection with the operation of an acoustic torpedo.

Those skilled in the art understand that in order to obtain directional beams from radiating surfaces, the dimensions of the radiating surface must be large in comparison to the wavelength of sound being radiated. For applications in which omnidirectional or broad beam patterns are required, the dimensions of the radiating surface are comparable to or small in comparison to the wavelength of sound being radiated. Whenever a small piston source is to be driven by electroacoustic transducer means, it is generally satisfactory to employ a single electroacoustic vibratory element to impart vibratory motion to the relatively small vibrating surface. When a concentrated directional beam pattern is required and the surface of the radiating structure is made large in comparison with the wavelength, it usually becomes difficult to drive a large size vibratile plate which is several wavelengths in its transverse dimension because flexural or transverse modes of vibration set up in the plate may introduce disturbing effects on the radiation pattern. To circumvent this difficulty, it has been the practice in the past to employ an array of separate small individual vibrating elements to obtain a large size radiating surface. A typical arrangement for accomplishing such an objective is shown in the crystal transducer delineated in FIGS. 7 and 8 of U.S. Pat. No. 2,427,062 in which an array of piezoelectric crystal plates, each having a radiating surface small in comparison to the wavelength, are arranged to produce a total radiating surface which is large in comparison with the wavelength and in which the combined elements operate

2 as a true piston surface. In this prior art illustrated example, the vibratile piston surface is the actual sum of the total array of the end faces of the crystal elements which are submerged in an oil filled housing and their combined vibrations are transmitted through the oil and through an enclosing acoustic rubber window. My present invention is concerned with the design of a transducer having a vibratile plate structure whose linear dimensions are large compared with the wavelength of sound and in which the vibratile plate is driven by a plurality of electroacoustic transducer means and the vibratile plate is designed to eliminate any undesirable flexural or transverse resonance modes of vibration.

An object of this invention is to provide a novel transducer design for producing controlled directional beam patterns.

A further object of my invention is to design a transducer for achieving separate directional beams within the same unitary structure.

A still further object of my invention is to design a transducer with a piston plate vibratile surface which is subdivided into a waffle-like pattern by cutting deep grooves into one surface of the plate to result in a number of separated small vibratile surfaces held together by a web of interconnecting material.

It is a still further object of my invention to design a multiple beam transducer which employs a unitary vibratile piston structure which is subdivided into a number of separate vibratile elements by providing grooves into one side of a unitary piston surface leaving a web-like interconnecting surface of material for keeping the subdivided area into a unitary mechanical structure.

Another object of my invention is to produce a low cost, more efficient transducer in which symmetrical multiple beam patterns may be generated and which may be more effectively employed for acoustic beam steering applications, such as in homing torpedoes.

A still further object of my invention is to reduce the secondary lobes in the beam pattern by providing a simple method of shading.

These and other objects of the invention will become evident in the following detailed description. The novel features which are characteristic of the invention are set forth with particularity in the appended claims. The invention itself, however, both as to its organization and method of operation, as well as advantages thereof, will best be understood from the following description of several embodiments thereof when read in connection with the accompanying drawings, in which:

FIG. 3 is a sectional view of an alternate arrangement for incorporating the basic features of the invention in which the transducer assembly is attached to the rear cover plate and the vibratile acoustic energy is transmitted through a sound transmitting fluid which is retained by a sound transparent rubber window which is sealed to the end of the housing structure.

FIG. 4 shows another alternate method of assembly which includes molding the vibratile sectionalized piston into the rubber window surface after which the assembly will follow the same general arrangement as illustrated in FIG. 3. The use of the alternate method illustrated in FIG. 4 avoids the necessity for oil filling the transducer as is required for the structure illustrated in FIG. 3.

FIG. 5 shows a detailed view of a method of assembly of the electroacoustic vibrator to drive one of the sectionalized portions of the vibratile piston surface. The arrangement illustrated in FIG. 5 is particularly advantageous over the arrangement illustrated in FIG. 2 when the transducer is to operate in very deep water such that the web-like surface between the separated piston sections is not adequate to safely support the hydrostatic pressure.

FIG. 6 illustrates the improvement in the reduction of the secondary lobe response which is achieved by a very simple method of shading which will be described in one form of my invention.

Figure 1:
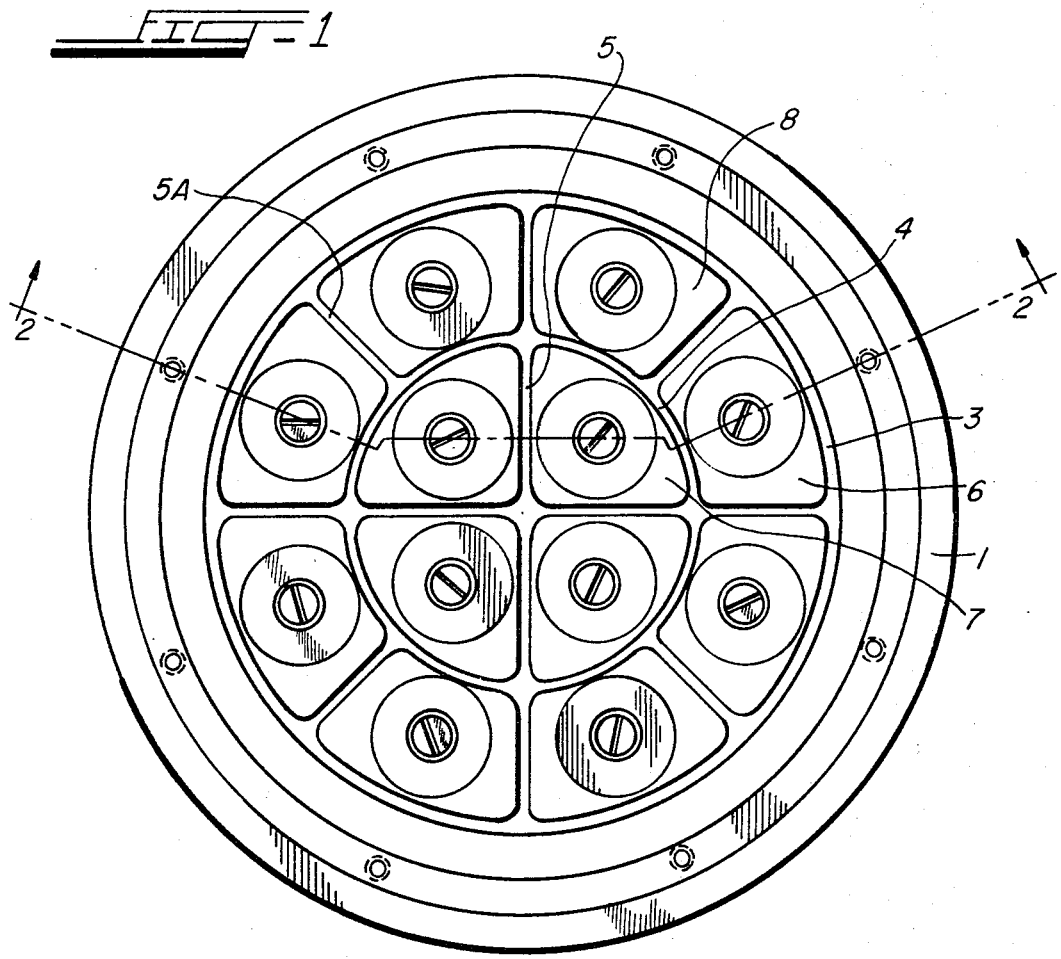
FIG. 1 is a partially schematic plan view looking down into the rear of a transducer incorporating the teachings of my invention with the rear lid removed.
Figure 2:
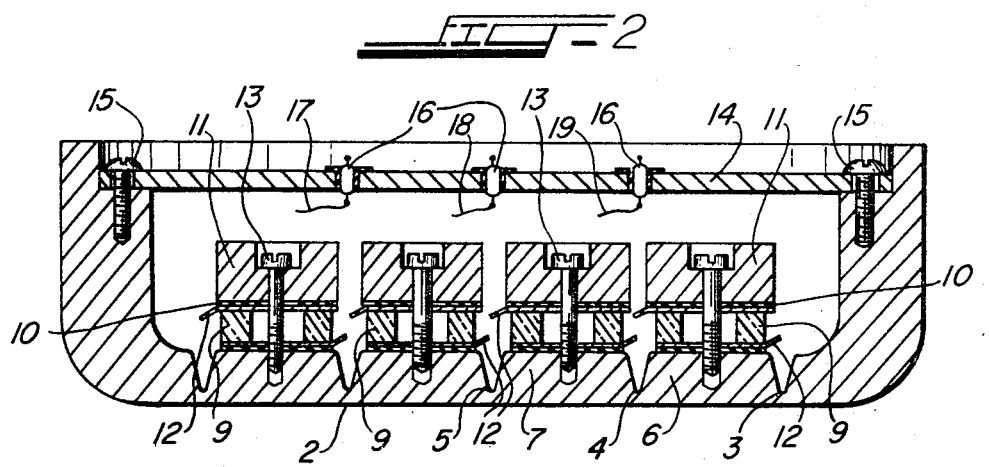
FIG. 2 is a sectional view taken along the line 2—2 of FIG. 1 including the rear lid which is not shown in FIG. 1.

Referring more specifically to the figures, FIG. 1 and FIG. 2 show one illustrative transducer construction embodying the present invention. A housing 1 is shown as a cylindrical cup-shaped structure having an outer flat vibratile radiating surface 2. The inside surface of the vibratile flat portion of the housing structure is provided with concentric web-like grooves 3 and 4, and radial grooves 5 and 5A which, for the particular illustration shown, creates twelve separate vibratile piston portions 6, 7, 8 held together by the thin connecting web-like matrix. In the illustration shown, I have chosen the diameter of the circular groove 4 to be slightly greater than one-half the diameter of the circular groove 3 in order that the three separate vibratile sections 6, 7 and 8 will be of approximately the same area. Each of the other three sections, which are formed in each of the remaining three quadrants of the array, will also be of approximately equal areas. The compliance of the web-like matrix which separates the vibratile portions of the composite piston structure is made high enough so that for the operating frequency of the transducer each vibratile piston section is acoustically disconnected from its neighbor although it remains mechanically attached for structural convenience. A more complete discussion of the relationship between the compliance of the web and its relationship to the operating frequency, the mass of the vibrating element, and the mass of the stationary outer peripheral portion of the housing, is given in my U.S. Pat. 3,319,219.

The active transducer elements chosen for operating the sectionalized vibratile portions of the grooved piston structure are the polarized ceramic rings 9, which, for example, may be manufactured of lead zirconate titanate piezoelectric material which, in this illustration is polarized for operating in the thickness mode which is one of the well known methods of polarization by anyone skilled in the art. I may also employ other types of polarizations such, for example, as is illustrated in FIGS. 1 and 2 of U.S. Pat. 3,319,219 in which the ceramic rings are polarized through the cylindrical wall of the material instead of along the axis of the cylinder as is the case in the illustration for part 9 in FIG. 2 of this specification. I could also employ crystal plates for the transducer active material such as illustrated, for example, in FIG. 3 of U.S. Pat. 3,328,751.

An insulating thin washer 10 is cemented to the inner surfaces of the subdivided piston structure such as at the sections 6 and 7, utilizing epoxy or any other suitable cement. An enlarged view of this assembly can be seen in better detail in FIG. 5. An insulating washer 10 is also cemented to the flat face of the inertial mass element 11. This is shown more clearly in FIG. 5 in which the inertial mass is numbered 11A. Thin metallic ring-shaped electrodes with radial tab extentions 12 are assembled between the insulating washers 10 and the electrode end surfaces of the ceramic elements 9. Epoxy or any other suitable cement may be used between the surfaces of the electrodes and ceramic insulators. Bolts 13 are employed as shown for holding the assembled elements together thereby resulting in twelve separate resonant assemblies in which the resonant frequency of each element is determined by the stiffness of the ceramic ring 9 and the mass of the sectionalized piston portion to which it is attached, as well as the mass of the inertial mass element 11 which is attached to the opposite surface of the ceramic ring as shown in FIG. 2. If the areas of each of the twelve subdivisions, as illustrated in FIG. 1, are made equal and if the mass of each of the inertial elements 11 are made equal, then the resonant frequency of each of the twelve sectionalized transducer elements will be alike, assuming that the ceramic elements 9 are alike. If there is any difference between the mass of the central sections of the subdivided piston as compared to the mass of outer peripheral sections, as shown in FIG. 1, it will be possible to synchronize the resonant frequencies of all the elements by modifying the mass of the inertial elements 11, as is well known in the art. If any tailoring of the inertial mass is required, either the length or diameter of the element 11 may be varied to make the necessary adjustment. In the arrangement illustrated in FIG. 2, the radiating portions of the sectionalized transducer surface is designed as an integral part of the housing structure. Each of the subdivided vibratile piston sections is driven by an active transducer element 9 and associated inertial mass element 9 held together with cement and a bolt 13. A cover plate 14 is fastened to the rear of the housing structure by means of the screws 15. Into the cover plate 14 are fastened a number of insulated electrical terminals 16 for providing external electrical connections to the assembled elements. Electrical conductors 17, 18, 19 connect the terminals 16 to the transducer element electrode connections 12 as desired. The internal electrical connection details to the elements are not shown because they may take a variety of arrangements to suit the desired application of the transducer. If the transducer is to operate as a narrow beam sound generator, all the twelve ceramic elements may be connected together to establish electrical connection simultaneously to all elements, thereby producing a directional beam pattern whose main beam angle is determined by the overall diameter of the sectionalized piston. The beam angle becomes sharper and develops secondary lobes as illustrated by the solid line in FIG. 6 as the diameter of the vibrating surface becomes greater than the wavelength of the radiated sound in the medium. If all the twelve elements 9 are connected electrically in parallel and each element is approximately of the same area, the total surface of the sectionalized piston will move at approximately the same amplitude and the magnitude of the secondary lobes, as shown in the solid curve in FIG. 6, will be about 17 db below the maximum intensity of the main beam. For the special quadrant arrangements illustrated in FIG. 1, if the two peripheral ceramic elements of each quadrant, such as 6 and 7, are connected electrically in series and the series connected pair are connected in parallel with the central element 7, the amplitude of the central element 7 will be approximately twice the amplitude of the peripheral elements 6 and 8. With this simple indicated electrical connection and with the further condition in which the radius of the circular groove 4 is selected to be in the approximate range of 50% to 60% of the radius of the outer peripheral groove 3, the resulting amplitude shading of the composite piston assembly will cause a considerable additional reduction (in the order of 10 db or more) in the magnitude of the secondary lobes as illustrated by the dotted line in FIG. 6. This desirable improvement in directional pattern is realized at low cost by the simple mechanical structure and electrical connections just described.

The use of four symmetrical sectors as illustrated in the design of FIG. 1 is particularly useful for transducers to be employed for acoustic steering, such as in homing torpedoes. If separate electrical connections are brought out for each of the four quadrants, it will be possible to compare the electrical phase of the received signals between adjacent horizontal or vertical quadrants or between horizontal or vertical adjacent half circles to determine whether the return of a transmitted acoustic signal is arriving from the left or right or from above or below the normal axis of the transducer and the information utilized for steering the torpedo. The electronic control means for phase comparison and steering is well known in the art and will not be detailed in this application since it is not a part of this invention which is only concerned with the design of an improved transducer which may be used for automatic acoustic steering as described.

The structural design illustrated in FIG. 2 is one embodiment of my invention which is satisfactory for applications in which the maximum water depth does not exceed hydrostatic pressures which the webbed sections 3, 4, 5, 5A can safely withstand. The use of a unitary housing structure with the vibratile end plate subdivided on the inside surface of the grooved construction as described above, permits the simple attachment of the internal vibratory structural components as previously described and the entire construction becomes a simple inexpensive assembly.

An alternative structural arrangement to the design illustrated in FIG. 2 is schematically shown in the sectional view of FIG. 3. The housing 1A has a sound transparent rubber window 22 molded or otherwise bonded to seal the bottom opening of the housing, as shown. The vibratile sectionalized piston assembly which includes the entire operating portion of the transducer assembly of FIGS. 1 and 2, such as would be obtained by cutitng through the peripheral outer web 3, is attached to the inside surface of the cover plate 14A preferably including a layer of low acoustic impedance material 20 such as corprene, between the end faces of the inertial mass elements 11 and the mounting surface of the cover plate 14A. A suitable cement, such as epoxy, may be employed for attaching the vibratile assembly to the corprene and cover plate. In the arrangement illustrated in FIG. 3, a sealed pressure-tight enclosure is required for the assembly which is achieved by the O-ring seal arrangement 21. The thickness of the cover plate 14A and size of bolts 15A are made adequate to safely withstand the hydrostatic pressure in which the transducer is to operate. The assembled structure is filled with a sound transmitting fluid such as castor oil or silicone 23 and the oil filled enclosure is sealed with the plug 24. A multi-terminal electrical connector 16A is used as a feed-through for making external electrical connection to the transducer. The wires 17, 18, 19 are connected as required to the electrode terminals 12 in the same fashion as described in FIG. 2.

Another structural variation embodying the teachings of my invention is illustrated in the partial cross-sectional view of FIG. 4. This arrangement utilizes a vibratile assembly similar to the construction of FIG. 3 except that the oil filling is eliminated and the radiating flat side of the sectionalized piston structure is bonded directly to the rubber window 22A. The remainder of the assembly is similar to that shown in FIG. 3 except that the oil filling is not required and therefore, the O-ring seal 21 and plug 24 may be omitted from the structure.

In the assembly illustrated in FIG. 2, the rear of the vibrating inertial mass elements 11 are not attached to anything and no hydrostatic pressure is transferred to the ceramic assembly. The entire hydrostatic pressure is supported by the radiating face of the housing structure. In the arrangements of FIGS. 3 and 4, the hydrostatic pressure is applied to the transducer element assembly and is supported by the back plate 14A which has to be designed to withstand these forces.

In the air-backed design of FIG. 2, it is not necessary that the exposed end faces of the mass members 11 be in one plane. In the other arrangements in which the ends of the mass members 11 are mounted against the backing plate, it is preferable that the exposed end surfaces of the mass members 11 be in a common plane. To achieve this requirement, I propose that only the diameters of the mass members 11 be modified when the mass is to be varied for tuning purposes and the thickness of the members remain fixed.

In order to improve the uniformity of operation of the transducer at varying depths for the constructions which expose the transducer material to the hydrostatic pressure variations such as illustrated in FIGS. 3 and 4, I propose the use of a compound plate and spring arrangement as shown in FIG. 5, for attaching the inertial mass to the vibratile assembly. The inertial mass element 11A is provided with a recessed surface into which a cup-shaped spring washer 25 is placed with convex side up, as shown. A second spring washer 26 is assembled convex side down in contact with the convex side of washer 25, as indicated. A plate member 27 is provided with a recessed surface for locating the spring washer 26 and is also counterbored for receiving the bolt 13A, as shown. The element assembly in FIG. 5 is operatively similar to one of the element assemblies shown in FIG. 2. The auxiliary spring and plate arrangement 25, 26, 27 which is interposed between the clamping bolt 13A and the inertial mass member 11A serves two important functions. In the first instance, the cup-shaped springs permit the control of the static stress which is impressed on the ceramic element by turning the bolt to compress the springs to a fixed desired amount. A very important additional advantage of this controlled method of applying static stress to the assembly is that as the hydrostatic presure varies with depth, the stress on the ceramic element remains constant because the hydrostatic force which is transmitted through the plate 27 to the back plate 14A, results in a corresponding decease in the tensile stress in the bolt 13A while the compressed springs 25, 26 maintain constant stress on the ceramic 9. This constant stress condition will obtain throughout all varying depths of operation down to a maximum value determined by the total initial compressive force impressed on the spring members 25, 26 at assembly.

While there has been shown and described several specific illustrative embodiments of the present invention, it will, of course, be understood that various modifications and alternative constructions may be made without departing from the true spirit and scope of the invention. Therefore, the appended claims are intended to cover all such modifications and alternative constructions as fall within their true spirit and scope.

I claim:

1. An electroacoustic transducer comprising a vibratile plate having a pair of opposite plane surfaces, a first of said pair of surfaces being divided by deep grooves into a plurality of acoustically separated vibratile piston elements, the total area of said elements greatly exceeding half of the total area of said plate, a plurality of transducer elements for converting electrical oscillations into mechanical vibrations, said transducer elements being individually attached in operable relationship to drive corresponding ones of said piston elements all of which vibrate in phase throughout their entire volume, multiple electrical conductor means connecting said transducer elements, further characterized in that said plurality of said vibratile piston elements are arranged in a symmetrical grouping on each side of a center line of said vibratile plate, and separate electrical connections for each of said symmetrical groupings on each side of said center line.

2. An electroacoustic transducer comprising a vibratile plate having a pair of opposite plane surfaces, a first of said pair of surfaces being divided by deep grooves into a plurality of acoustically separated vibratile piston elements, said elements being arranged in symmetrical grouping on each side of a center line of said vibratile plate, a plurality of piezoelectric transducer elements for converting electrical oscillations into mechanical vibrations, said transducer elements being individually attached in operable relationship to corresponding ones of said piston elements, and multiple electrical conductor means interconnecting said transducer elements, further characterized in that a pair of transducer elements are connected electrically in series and still further characterized in that a third of said transducer elements is electrically connected in parallel with said series connected pair.

3. The invention in claim 2 further characterized in that a multiple of said symmetrical groupings comprise four identical quadrants with each quadrant containing a first piston element adjacent to the said normal axis of said vibratile plate and two additional piston elements remove from said normal axis and symmetrically located about the outer periphery of said first piston element.

4. An electroacoustic transducer comprising a circular vibratile plate having a pair of opposite plane surfaces, a first of said pair of surfaces being divided by deep grooves into a plurality of acoustically separated vibratile piston elements, said grooves including two concentric circular grooves, the diameter of the smaller circular groove being approximately 50% to 60% of the diameter of the larger circular groove, a plurality of transducer elements for converting electrical oscillations into mechanical vibrations, said trandsucer elements being individually attached in operable relationship to corresponding ones of said piston elements, and multiple electrical conductor means connecting said transducer elements, the transducer elements lying within the area bounded by the smaller circular groove being electrically connected to operate at greater amplitude than the elements lying in the region between said concentric grooves.

5. An electroacoustic transducer capable of operating under water, a housing structure including a peripheral wall portion, a vibratile plate portion sealed to one end of said peripheral wall portion, said vibratile plate portion characterized in that the linear transverse dimension of said plate is greater than the wavelength of sound in water at the frequency of operation of said transducer, grooves in one surface of said plate portion for dividing said plate into a plurality of acoustically separated vibratile piston elements held together mechanically by the thin web-like grid structure remaining beneath the bottom of said grooves, a plurality of transducer elements for converting electrical oscillations to mechanical vibrations, means for attaching said transducer elements in operable relationship to drive said separated vibratile piston elements, multiple electrical conductor means connecting said plurality of transducer elements, and a plurality of inertial mass elements, means for attaching said mass and transducer elements in operable relationship with each of said transducer elements being individually and mechanically bonded between an associated one of said piston elements and said inertial mass elements so that axial vibration of said elements take place responsive to vibration of said transducer elements, means for applying a compressive mechanical stress along the vibrational axis of each of said transducer elements, said means including a rigid washer-like plate, a spring, and mechanical fastening means for applying a compressive force from said rigid washer through said spring, to the associated inertial mass element and along the vibrating axis of said tranducer element.

6. The invention in claim 5 characterized in that the tranducer element is in the form of a hollow cylinder and further characterized in that said mechanical fastening means is a bolt which passes through the hollow cylinder.

7. An electroacoustic transducer comprising a circular vibratile plate having a pair of opposite plane surfaces, a first of said pair of surfaces being divided by deep grooves into a plurality of acoustically separated vibratile piston elements, said grooves including two concentric circular grooves, a plurality of transducer elements for converting electrical oscillations into mechanical vibrations, said transducer elements being individually attached in operable relationship to corresponding ones of said piston elements, and multiple electrical conductor means connecting said transducer elements, the transducer elements lying within the area bounded by the smaller circular groove being electrically connected to operate at greater amplitude than the elements lying in the region between said concentric grooves.

8. The invention in claim 1 further characterized in that said plurality of said vibratile piston elements are arranged in multiple symmetrical groupings about an axis normal to the plane of said vibratile plate.

9. The invention in claim 8 further characterized in that each of said multiple symmetrical groups include a pair of transducer elements spaced at a distance removed from the normal axis of said vibratile plate, and a third transducer element located adjacent to said normal axis.

10. The invention in claim 8 further characterized in that said multiple symmetrical groupings comprise four identical quadrants with each quadrant containing a first piston element adjacent to the said normal axis of said vibratile plate and two additional piston elements removed from said normal axis and symmetrically located about the outer periphery of said first piston element.

11. The invention in claim 10 further characterized in that each of said piston elements are approximately of the same surface area.

12. The invention in claim 11 further characterized in that each of the transducer elements attached to said piston elements are alike.

13. The invention in claim 12 further characterized in that said two outer peripheral elements in each quadrant are connected electrically in series.

References Cited

UNITED STATES PATENTS

| | | | |
|---|---|---|---|
| 2,063,951 | 12/1936 | Steinberger. | |
| 2,181,132 | 11/1939 | Kallmeyer | 340—10 |
| 2,748,369 | 5/1956 | Smyth | 340—10 |
| 2,912,856 | 11/1959 | Kritz | 340—10 X |
| 2,921,288 | 1/1960 | O'Neill et al. | 340—9 X |
| 2,963,681 | 12/1960 | Morgan | 340—14 X |
| 2,979,690 | 4/1961 | Hackley | 340—8 |

RODNEY D. BENNETT, Primary Examiner

B. L. RIBANDO, Assistant Examiner

U.S. Cl. X.R.

340—10, 14